No. 886,674. PATENTED MAY 5, 1908.
J. BIANCHI.
LIFE MOTION PICTURE APPARATUS.
APPLICATION FILED SEPT. 7, 1907.

2 SHEETS—SHEET 1.

WITNESSES:
F. W. McKendrick
R. G. Brittain

INVENTOR.
Joseph Bianchi
BY Ridout & Maybee
ATTORNEYS

No. 886,674. PATENTED MAY 5, 1908.
J. BIANCHI.
LIFE MOTION PICTURE APPARATUS.
APPLICATION FILED SEPT. 7, 1907.

2 SHEETS—SHEET 2.

WITNESSES:

INVENTOR,
Joseph Bianchi
BY
ATTORNEYS

UNITED STATES PATENT OFFICE.

JOSEPH BIANCHI, OF TORONTO, ONTARIO, CANADA, ASSIGNOR OF ONE-HALF TO SAMUEL CASEY WOOD, OF TORONTO, CANADA.

LIFE-MOTION-PICTURE APPARATUS.

No. 886,674.      Specification of Letters Patent.      Patented May 5, 1908.

Application filed September 7, 1907. Serial No. 391,792.

*To all whom it may concern:*

Be it known that I, JOSEPH BIANCHI, a citizen of the United States, residing in the city of Toronto, Province of Ontario, Canada, have invented certain new and useful Improvements in Life-Motion-Picture Apparatus, of which the following is a specification.

My invention relates to apparatus designed to take a series of consecutive pictures of objects in motion on a continuously moving film or other photographic surface. Heretofore such results have usually been obtained by moving the objective, or working lens, to compensate for the movement of the film but such movement of the objective relative to the view produces pictures blurred in outline and having the appearance of being out of focus.

In my improved apparatus the objective is fixed and the image formed by the objective is caused to follow the moving film by means of a movably mounted lens arranged between the objective and the film which lens is moved to refract the rays forming the image in such a manner that the image during the total exposure remains on the same part of the film. I prefer to use a cylindrical lens mounted in the exposure opening of an ordinary rotating circular shutter and provided with means whereby during exposure its axis of curvature is maintained at right angles to the line of movement of the film.

Figure 1:
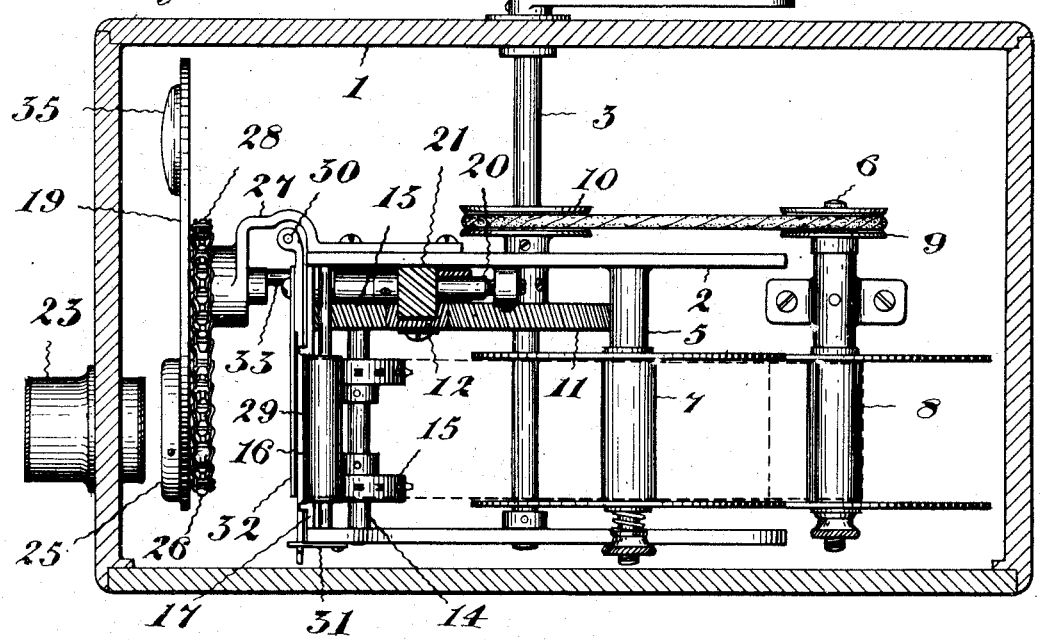
Figure 2:
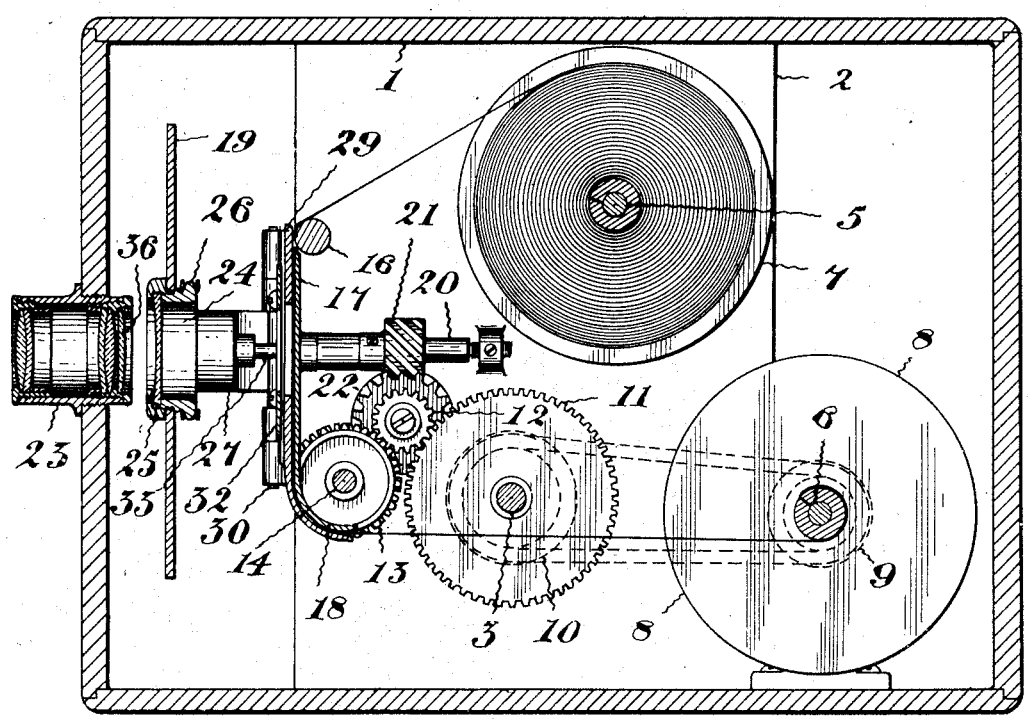
Figure 3:
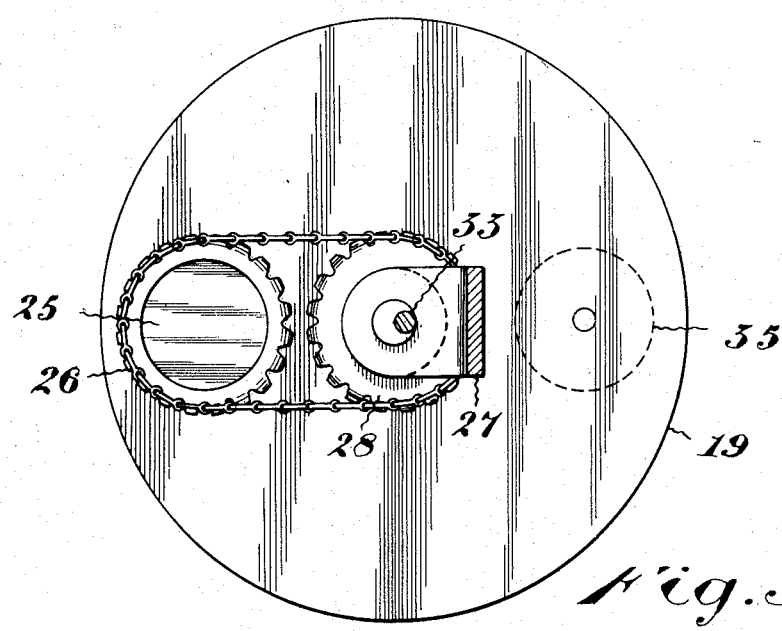
Figure 4:
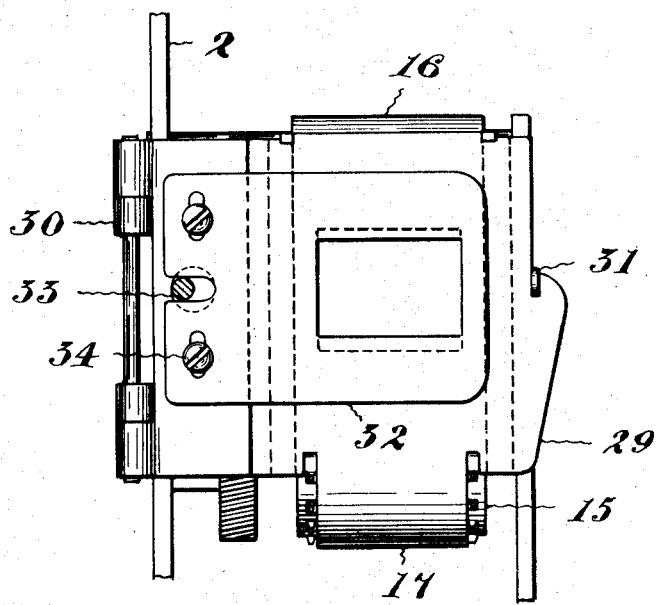

Figure 1 is a plan view of the apparatus. Fig. 2 is a side elevation of the same partly in section. Fig. 3 is a rear view of the shutter. Fig. 4 is a face view of the framing device.

In the drawings like letters of reference indicate corresponding parts in the different figures.

In its general arrangement the apparatus is similar to the older constructions.

1 is the containing case within which is secured the frame 2. In the box and frame is journaled the driving shaft 3 driven outside the case with a suitable crank handle 4. Suitably journaled in the frame are the spindles 5 and 6 adapted respectively to carry the spool 7 from which the film is wound and the spool 8 onto which it is wound. The spindle 6 is provided with a pulley 9 driven by a suitable belt from the pulley 10 on the driving shaft 3. The driving shaft also carries a gear wheel 11 which meshes with the pinion 12 suitably journaled on the frame. This pinion 12 meshes with a gear wheel 13 fast on the spindle 14 suitably journaled on the frame. This spindle carries the sprocket wheels 15 which move the film. The film passes from the spool 7 over a roller 16 journaled at the top of the frame, over the backing plate 17, round the roller 18 journaled near the bottom of the frame, and thence to the spool 8.

It will be noted that the gears above described are spirally cut as I find this renders them quieter and steadier in their operation.

19 is a rotary shutter which is secured to the spindle 20 suitably journaled in the frame of the apparatus. The spindle 20 has a worm 21 fast thereon which meshes with the worm wheel 22 fast to the pinion 12. From this construction it will appear that the film is continuously moved and the shutter simultaneously rotated by operating the crank handle 4. The parts just described are substantially old in the art, my invention lying particularly in the constructions I am about to describe when combined with the moving film.

23 is an objective of ordinary construction suitably supported on the case. The objective is opposite the backing plate 17 and between it and the backing plate extends the disk of the shutter which is provided with the exposing aperture 24. The image created by the objective is thus thrown on the moving film every time the aperture in the shutter comes opposite the objective but as the film is continuously moving the resulting picture would be blurred in outline unless the image be caused to follow the movement of the film. To compensate for this movement of the film I place in the aperture of the shutters 19 a lens 25. This lens moving with the shutter causes a displacement of the image on the film owing to its refractory effect on the rays forming the image. Any lens may be employed between the objective and the film to effect this displacement but the movement given the lens must be such that the displacement of the image is in the line of motion of the film.

As the exposing aperture moves in an arc of a circle I find it necessary to employ a cylindrical lens and to maintain the axis of curvature of this cylindrical lens during exposure at right angles to the line of motion of the film. To enable this to be done I revolubly mount the lens 25 in the exposing aperture and connect the sprocket wheel 26 to the mounting of the lens.

The bracket 27 connected to the frame 2 forms one of the bearings for the shaft 19 and on this bracket I secure a stationary sprocket wheel 28 which is connected by a sprocket chain with the sprocket wheel 26. From this construction it follows that as the shutter rotates the lens 25 is rotated in its bearings to retain it with its axis of curvature in the required position. Of course, other means might be employed to effect this result. The cylindrical lens employed may be either positive or negative but it should be observed that if a positive lens be employed the lens must be moved in the same direction as the film, while, if a negative lens is employed the motion must be in the opposite direction. Although a moving lens interposed between the objective and film will bend the rays and cause the image to move at the same rate as the moving film, yet, it will also affect the projected rays so as to prevent a sharp focus of the image. I, therefore, find it necessary to place a second lens of opposite curvature and power in a fixed position in the optical axis in order to obviate this defect.

In the drawings I show a negative cylindrical lens as a refractor and behind the objective a positive cylindrical lens 36 of exactly opposite strength, thus exactly neutralizing the blurring effect of the refracting lens while not interfering with the displacement of the image by the latter when the shutter is rotated. Of course, if the refracting lens is a positive cylinder the stationary lens must be a negative cylinder. In fact, whatever form of non-achromatic lens be employed as a refractor a suitable correction should be applied to the stationary part of the optical combination.

I also employ with the apparatus a stationary framing device 29 which comprises a plate with an aperture therein longer in the direction of the length of the film than the image by an amount at least equal to the movement of the film during exposure. This framing device is hinged at 30 on the frame 2 and is held in place in front of the film by the hook 31. This stationary framing device carries a movable framing device 32 which comprises a flat plate provided with an aperture about the size of the image. This movable framing device is slidably connected with the stationary framing device by means of the pins 34 which pass through slots in the movable framing device. This movable framing device is also slotted or notched to engage the crank 33 formed on the spindle 20 of the rotating shutter. The movable framing device will thus be reciprocated synchronously with the rotation of the shaft being caused to travel in the direction of motion of the film during exposure and to return to its original position during the interval which elapses between exposures. Other framing devices might be employed, of course, for the purpose of excluding the unnecessary rays of light from the film and for preventing the pictures from encroaching or overlapping each other at the line of separation.

As the revolving shutter also acts as a carrier for the refracting lens I find it necessary in order to insure freedom from vibration, to balance the revolving shutter and for this purpose a weight 35 is secured to the shaft diametrically opposite the refracting lens, which prevents the vibration of outline in the pictures which latter is very detrimental to sharpness.

I refer to the sensitive surface all through as a film. By this term will be understood any surface on which a picture is to be impressed or on which it is already existing. In other words, if the device is used as a camera any suitable moving sensitive surface may be employed and if the device is to be used for projection any suitable series of transparent pictures may be employed which I include in the general term, film. Nor do I desire to confine myself to the use of only one lens on the shutter as sometimes more than one may be desirable, particularly if the apparatus be used for projection.

What I claim as my invention is:

1. In life-motion picture apparatus the combination of a stationary objective; means for continuously moving a film; a movable cylindrical lens between the film and the objective; means for moving said lens to compensate for the movement of the film; and means for maintaining the axis of curvature of the lens at right angles to the line of movement of the film.

2. In life-motion picture apparatus the combination of a stationary objective; means for continuously moving a film; a movable lens between the film and the objective; means for moving said lens to compensate for the movement of the film; and a stationary correcting lens in the optical axis.

3. In life-motion picture apparatus the combination of a stationary objective; means for continuously moving a film; a movable cylindrical lens between the film and the objective; means for moving said lens to compensate for the movement of the film; and a stationary cylindrical correcting lens in the optical axis.

4. In life-motion picture apparatus the combination of a stationary objective; means for continuously moving a film; a movable cylindrical lens between the film and the objective; means for moving said lens to compensate for the movement of the film; means for maintaining the axis of curvature of the lens at right angles to the line of movement of the film; and a stationary cylindrical correcting lens in the optical axis.

5. In life-motion picture apparatus the combination of a stationary objective; means for continuously moving a film; a carrier rotating in a plane parallel to the film; a cylindrical lens revolubly mounted in said rotating carrier; and means for holding the lens with the axis of its curvature at right angles to the line of movement of the film.

6. In life-motion picture apparatus the combination of a stationary objective; means for continuously moving a film; a carrier rotating in a plane parallel to the film; a cylindrical lens revolubly mounted in said rotating carrier; means for holding the lens with the axis of its curvature at right angles to the line of movement of the film; and a counterbalancing weight on the carrier.

7. In life-motion picture apparatus the combination of a stationary objective; means for continuously moving a film; a carrier rotating in a plane parallel to the film; a cylindrical lens revolubly mounted in said rotating carrier; means for holding the lens with the axis of its curvature at right angles to the line of movement of the film; and a framing device reciprocatable in the line of movement of the film.

8. In life-motion picture apparatus the combination of a stationary objective; means for moving a film; a spindle adapted to drive said means; an apertured shutter fast on said spindle; a cylindrical lens revolubly mounted in the aperture of said shutter; a bearing for the spindle; and gearing between said bearing and the revoluble lens whereby the latter is held with the axis of its curvature at right angles to the line of movement of the film.

9. In life-motion picture apparatus the combination of a stationary objective; means for moving a film; a spindle adapted to drive said means; an apertured shutter fast on said spindle; a cylindrical lens revolubly mounted in the aperture of said shutter; a bearing for the spindle; gearing between said bearing and the revoluble lens whereby the latter is held with the axis of its curvature at right angles to the line of movement of the film; a framing device slidably mounted in front of the film; and a crank on the spindle adapted to reciprocate the framing device.

10. In a life-motion picture apparatus the combination of a stationary objective; means for moving a film; a spindle adapted to drive said means; an apertured shutter fast on said spindle; a cylindrical lens revolubly mounted in the aperture of said shutter; a bearing for the spindle and a sprocket wheel on said spindle; a sprocket wheel connected to the lens mounting; and a sprocket chain connecting the two sprocket wheels whereby the lens is held with the axis of its curvature at right angles to the line of movement of the film.

11. In life-motion picture apparatus the combination of a spindle; an apertured shutter secured to the spindle; a lens revolubly mounted in the aperture of said shutter; a stationary part; and sprocket and chain gearing between the lenses and the said stationary part whereby the lens is held with any given diameter in a constant direction.

Toronto, Ont., 31st August, 1907.

JOSEPH BIANCHI.

In the presence of—
 E. MERNER,
 R. S. CHILTON, Jr.